Patented July 27, 1937

2,088,083

UNITED STATES PATENT OFFICE 2,088,083

METHOD FOR THE RECOVERY OF ALCOHOLS

William Engs and Richard Moravec, Berkeley, Calif., assignors to Shell Development Company, San Francisco, Calif., a corporation of Delaware No Drawing. Application June 9, 1931, Serial No. 543,159

14 Claims. (Cl. 260—156)

This invention relates to a process for the recovery of secondary and/or tertiary alcohols from acid solutions containing the same and is more particularly concerned with the increased yields of tertiary alcohols from their sulfuric acid solutions.

According to known methods, fluids containing olefines are reacted with sulfuric and other mineral acids to form reaction products. With secondary-base olefines, the reaction products comprise their corresponding esters but with tertiary-base olefines, it is doubtful what is the exact composition of the reaction product of tertiary-base olefines with acid and therefore the expression "reaction product" is employed herein to designate the product obtained by reaction of a secondary-base or tertiary-base olefine with an acid under such conditions that subsequent dilution of the product with an aqueous medium followed by distillation will yield the corresponding alcohol. The solutions of the reaction products are then diluted with water and distilled to remove the corresponding alcohols. Some sources of olefine-containing fluids are gases derived from petroleum, peat, coal, oil shales and like carboniferous natural materials which when subjected to cracking treatment under certain conditions as may be ascertained from the art have their olefinic content increased.

During the process of hydrolysis and distillation, the yield of alcohol is reduced by polymerization and/or by decomposition of the reaction products. Especially is this true with reaction products formed from tertiary-base olefines such as isobutylene, trimethyl ethylene and the like with acid. With esters formed from secondary-base olefines as from propylene, butene-1 butene-2, pentene-1, pentene-2 and the like, the side reactions proceed more slowly but to an appreciable extent. In order to minimize the loss of yield due to these side reactions, it has been and still is customary to dilute the acid solutions of the reaction products with an aqueous medium such as water to reduce the acid concentration to some predetermined value or to neutralize the acid before distillation. In practice, workers in the art first neutralize and then distill the acid solutions of the alcohols obtained from tertiary-base olefines as direct distillation without prior neutralization is accompanied by large losses of available alcohol.

With the increased importance of alcohol production, the present day methods of recovering secondary and tertiary alcohols from their acid solutions are not economical. Dilution of the acid solution enhances the final cost of the alcohol because of the low value of the resulting dilute acid and neutralization enhances the final cost of the alcohol because the resulting salt, say sodium sulfate, has practically no value. Furthermore, distillation of the diluted solution in the ordinary way results in appreciable losses of available alcohol as polymers and olefines.

We have found that in the production of alcohols, particularly of tertiary alcohols, from the corresponding reaction products, the rate of decomposition of the reaction product to products other than the desired alcohol is a function of the acid concentration, temperature of distillation and time of heating. At low temperatures and with very short times of heating, we are able to obtain a very high yield of alcohol, with very little side decomposition or polymerization.

The favorable effect is in part due to the short period of heating and in part to the low temperature of vaporization consequent on working under reduced pressure. The time and temperature factors are dependent upon the character of the olefine-reaction product undergoing treatment and accordingly can be varied so long as the alcohol is evaporated from the acid solution at a temperature below that at which decomposition and/or polymerization occurs and more or less quickly removed from the heated zone of operation. Favorable results to a less degree can be obtained if only one of these advantageous conditions is secured.

For illustrative purposes only, we will describe our process as carried out for the production of tertiary butyl alcohol. The acid solution of the alcohol is heated in a heating zone for the absolute minimum of time and at the lowest possible temperature compatible with the removal of the alcohol vapors. We prefer to carry out our invention in an apparatus as a film evaporator operated under reduced pressure, the essential features being that the cold liquor is caused to flow over a heated surface so that the alcohol is very rapidly distilled from it and that the liquid is swept rapidly through the heated zone. By working under reduced pressure the advantage of low temperature of distillation is added to that of short time of contact with the heated zone.

The theory of operation with secondary alcohols may be ascribed to the following phenomena: the acid solution of the ester contains besides the free acid and the ester also water and free alcohol formed by the partial hydrolysis of the ester in solution. By quickly evaporating and removing the alcohol, part of the ester becomes hydrolyzed by the water to the alcohol which in turn is quickly removed and so on. Eventually a high yield of alcohol is obtained. The alcohol on distillation is accompanied by some water as a constant boiling mixture, thus reducing the aqueous content of the solution which is recovered as acid of a strength greater than that originally present in the system. The employment of subatmospheric pressures permits distillation to take place at a temperature at which decomposition and/or polymerization of the olefine-reaction product is substantially avoided.

By way of example only, the following table discloses a comparative study of the maximum allowable concentrations of acid before distillation:

| | Film evaporation under reduced pressure | Ordinary distillation |
|---|---|---|
| | Percent | Percent |
| Secondary alcohols | 35 to 40 | 15 |
| Tertiary alcohols | 35 | 0 |

Besides the avoidance of the undesirable side-reaction products, and the obtaining of very high yields of secondary and/or tertiary alcohols, the process permits the use of lower temperatures and the omission of neutralizing agents as well as the recovery of concentrated acid—all tending to a flexible and economical method of operation. Our process avoids unnecessary and excessive dilution prior to evaporation of the alcohols as evidenced by the table although a slight dilution is required to bring the acidity of the solution below 40%. By "substantial dilution" we mean such dilutions of acid liquors as have heretofore been customary practice as evidenced, for example, by United States Patent 1,790,518.

The process as practiced also effects the speeding up of the hydrolysis of the reaction product by the continuous removal of one of the reaction products, to wit: secondary or tertiary alcohol during hydrolysis.

The process may be conducted with mixtures of reaction products of secondary and/or tertiary-base olefines or may be practiced with fractions containing substantially individual reaction products of secondary and/or tertiary-base olefines.

We claim as our invention:

1. The process of producing saturated aliphatic monohydric secondary and tertiary alcohols from an acid solution of their corresponding olefines comprising rapidly evaporating alcohol from said acid solution by contacting the latter with a heated surface at a temperature at which the corresponding alcohol vaporizes and quickly removing the alcohol vapors from the heated surface.

2. The process of producing saturated aliphatic monohydric secondary and tertiary alcohols from a sulfuric acid solution of their corresponding olefines comprising rapidly evaporating alcohol from said acid solution by contacting the latter with a heated surface at a temperature at which the corresponding alcohol vaporizes and quickly removing the alcohol vapors from the heated surface.

3. The process of producing alcohol of the type

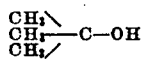

from a sulfuric acid solution of tertiary butylene comprising rapidly evaporating alcohol from said acid solution by contacting the latter with a heated surface at a temperature at which the corresponding alcohol vaporizes and quickly removing the alcohol vapors from the heated surface.

4. The process of producing a saturated aliphatic monohydric tertiary alcohol from an acid solution of its corresponding olefine containing more than three carbon atoms to the molecule while substantially avoiding polymerization and decomposition reactions, comprising: causing said solution to contact with a heated surface at a temperature at which the corresponding alcohol vaporizes while working under at least a partial vacuum without first substantially diluting the acid solution with water.

5. The process of producing an alcohol of the formula

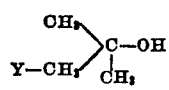

wherein Y represents hydrogen or CH₃, from a sulfuric acid solution of a tertiary-base olefine containing four to five carbon atoms to the molecule while substantially avoiding polymerization and decomposition reactions, comprising: causing said solution to contact with a heated surface at a temperature at which the corresponding alcohol vaporizes while working under at least a partial vacuum without first substantially diluting the acid solution with water.

6. The process of producing a saturated aliphatic monohydric tertiary pentyl alcohol from a sulfuric acid solution of amylene while substantially avoiding polymerization and decomposition reactions, comprising: causing said solution to contact with a heated surface at a temperature at which the corresponding alcohol vaporizes while working under at least a partial vacuum without first substantially diluting the acid solution with water.

7. The process of producing a saturated aliphatic monohydric tertiary alcohol from an acid solution of its corresponding tertiary-base olefine while substantially avoiding polymerization and decomposition reactions, comprising: causing said solution to contact with a heated surface at a temperature at which the corresponding alcohol vaporizes without first substantially diluting the acid solution with water.

8. The process of producing saturated aliphatic monohydric tertiary butyl alcohol from a sulfuric acid solution of butylene while substantially avoiding polymerization and decomposition reactions, comprising: subjecting said solution to flash distillation at a temperature at which the tertiary butyl alcohol vaporizes.

9. The process of producing saturated aliphatic monohydric tertiary amyl alcohol from a sulfuric acid solution of amylene while substantially avoiding polymerization and decomposition reactions, comprising: subjecting said solution to flash distillation at a temperature at which the tertiary amyl alcohol vaporizes.

10. The process of producing saturated, aliphatic, monohydric, secondary and tertiary alcohols from acid solutions of their corresponding olefines which comprises, distilling said acid solutions containing an appreciable quantity of free acid, but not less than about 35% in a film evaporator under reduced pressure.

11. The process of producing saturated, aliphatic, monohydric, secondary and tertiary alcohols from sulfuric acid solutions of their corresponding olefines which comprises, distilling said sulfuric acid solutions containing an appreciable quantity of free acid, but not less than about 35% in a film evaporator under reduced pressure.

12. The process of producing tertiary butyl alcohol and its homologues from sulfuric acid solutions of their corresponding tertiary olefines which comprises, distilling said sulfuric acid solutions containing an appreciable quantity of free acid, but not less than about 35% in a film evaporator under reduced pressure.

13. The process of producing saturated, aliphatic, monohydric, tertiary alcohols from sulfuric acid solutions of their corresponding olefines of about 35% $H_2SO_4$ concentration, which comprises, rapidly evaporating alcohol from said sulfuric acid solutions and quickly removing the alcohol vapors from the evaporation zone.

14. The process of producing saturated, aliphatic, monohydric, tertiary alcohols from sulfuric acid solutions of their corresponding olefines of about 35% $H_2SO_4$ concentration, which comprises, rapidly evaporating alcohol from said sulfuric acid solutions under reduced pressure and quickly removing alcohol vapors from the evaporation zone.

WILLIAM ENGS.
RICHARD MORAVEC.